(12) United States Patent
Campo Giralte et al.

(10) Patent No.: US 9,576,025 B1
(45) Date of Patent: Feb. 21, 2017

(54) ABSTRACTING DENORMALIZED DATA DATASETS IN RELATIONAL DATABASE MANAGEMENT SYSTEMS

(71) Applicant: International Business Machines Corporation, Armonk, NY (US)

(72) Inventors: Luis Campo Giralte, Dublin (IE); Jose Luis Mujeriego Gomez, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/947,131

(22) Filed: Nov. 20, 2015

(51) Int. Cl.
*G06F 17/30* (2006.01)
(52) U.S. Cl.
CPC ... *G06F 17/30427* (2013.01); *G06F 17/30292* (2013.01)
(58) Field of Classification Search
None
See application file for complete search history.

(56) References Cited

U.S. PATENT DOCUMENTS

| | | | |
|---|---|---|---|
| 5,369,761 A | 11/1994 | Conley et al. | |
| 6,167,399 A * | 12/2000 | Hoang | G06F 17/30324 |
| 7,236,993 B2 | 6/2007 | Brown et al. | |
| 2002/0184222 A1 * | 12/2002 | Kohut | G06F 17/30286 |
| 2006/0095413 A1 | 5/2006 | Moffat et al. | |
| 2007/0124276 A1 * | 5/2007 | Weissman | G06F 17/30442 |
| 2008/0059604 A1 | 3/2008 | Brunnabend et al. | |
| 2011/0173164 A1 | 7/2011 | Bendel et al. | |
| 2014/0067791 A1 | 3/2014 | Idicula et al. | |

FOREIGN PATENT DOCUMENTS

CN 103823823 A 5/2014

OTHER PUBLICATIONS

Teradata, "Database Design > Denormalizing the Physical Schema," Information Products Home, Teradata Database, Tools and Utilities Release 15.00, http://www.info.teradata.com/HTMLPubs/DB_TTU_15_00/index.html#page/Database_Management/B035_1094_015K/ch07.059.01.html#ww710305, Printed on Oct. 21, 2015, pp. 1-2.

(Continued)

*Primary Examiner* — Alexey Shmatov
*Assistant Examiner* — Matthew Ellis
(74) *Attorney, Agent, or Firm* — Erik K. Johnson

(57) ABSTRACT

A denormalized dataset, an associated primary key field, one or more associated secondary key fields and information identifying one or more normalized datasets associated with each secondary key field, is received. A denormalized table comprising fields and data types corresponding to said denormalized dataset, said denormalized table having a primary key field corresponding to said primary key field associated with said denormalized dataset, is created. The said information identifying the one or more normalized datasets associated with each secondary key field, creating one or more normalized tables, each of said one or more normalized tables corresponding to a respective one of said one or more normalized datasets, each of said one or more normalized tables comprising a foreign key corresponding to said associated primary key and a primary key corresponding to the secondary key field associated with said normalized dataset, is utilized. Additionally, each of said foreign keys is utilized.

3 Claims, 11 Drawing Sheets

(56) References Cited

OTHER PUBLICATIONS

Mell et al., "The Nist Definition of Cloud Computing," National Institute of Standards and Technology, U.S Department of Commerce, Special Publication 800-145, Sep. 2011, pp. 1-7.

Hollingsworth, "Data Normalization, Denormalization, and the Forces of Darkness," a white paper by Melissa Hollingsworth, http://fastanimals.com/melissa/WhitePapers/NormalizationDenormalizationWhitePaper.pdf, Accessed on Jun. 17, 2015, pp. 1-26.

* cited by examiner

500

| Employee | Country | Rating | Annual Base Pay | Competency |
|---|---|---|---|---|
| 21001 | BR | Average | 192674.38 | Building Talent |
| 21001 | BR | Average | 192674.38 | Core Values |
| 21001 | BR | Average | 192674.38 | Leadership |
| 21001 | BR | Average | 192674.38 | Organization |
| 21002 | US | Average | 294586.88 | Building Talent |
| 21002 | US | Average | 294586.88 | Leadership |
| 21002 | US | Average | 294586.88 | Organization |
| 21002 | US | Average | 294586.88 | Building Talent |
| 21002 | US | Average | 294586.88 | Leadership |
| 21002 | US | Average | 294586.88 | Organization |
| 21002 | US | Average | 294586.88 | Building Talent |
| 21002 | US | Average | 294586.88 | Leadership |
| 21002 | US | Average | 294586.88 | Organization |
| 21003 | MX | Average | 317212.13 | Leadership |
| 21003 | MX | Average | 317212.13 | Organization |
| 21003 | MX | Average | 317212.13 | Leadership |
| 21003 | MX | Average | 317212.13 | Organization |

FIG. 5A

| Employee | Competency Level | Education ID | Institution Name | Institution Location |
|---|---|---|---|---|
| 21001 | Proficient | | | |
| 21001 | Advanced | | | |
| 21001 | Advanced | | | |
| 21001 | Advanced | | | |
| 21002 | Advanced | EDUCATION-4-163 | | San Francisco |
| 21002 | Expert | EDUCATION-4-229 | Rice University | Houston, TX |
| 21002 | Proficient | EDUCATION-4-59 | University of Chicago | Chicago, IL |
| 21002 | Advanced | EDUCATION-4-59 | University of Chicago | Chicago, IL |
| 21002 | Expert | EDUCATION-4-163 | | San Francisco |
| 21002 | Proficient | EDUCATION-4-229 | Rice University | Houston, TX |
| 21002 | Advanced | EDUCATION-4-229 | Rice University | Houston, TX |
| 21002 | Expert | EDUCATION-4-59 | University of Chicago | Chicago, IL |
| 21002 | Proficient | EDUCATION-4-163 | | San Francisco |
| 21003 | Proficient | EDUCATION-4-23 | University of Massachusetts | |
| 21003 | Advanced | EDUCATION-4-59 | University of Chicago | Chicago, IL |
| 21003 | Proficient | EDUCATION-4-59 | University of Chicago | Chicago, IL |
| 21003 | Advanced | EDUCATION-4-23 | University of Massachusetts | |

FIG. 5B

ABSTRACTING DENORMALIZED DATA DATASETS IN RELATIONAL DATABASE MANAGEMENT SYSTEMS

BACKGROUND OF THE INVENTION

The present invention relates generally to the field of denormalized datasets, and more particularly to executing database queries on abstracted denormalized datasets in a relational database management system (RDBMS) environment.

Normalized data datasets can be denormalized by adding redundant data or grouping data from the normalized datasets. Redundant or duplicate items may impact the results of search queries which can be executed to the denormalized datasets, as well as impact the final figures for the denormalized datasets. Final figures gathered for denormalized datasets can include counts, average, standard deviation and other statistical information, which can be distorted from duplicate items in the denormalized datasets.

SUMMARY

Embodiments of the present invention disclose a method, a computer system, and computer program products for database access. A denormalized dataset, an associated primary key field, one or more associated secondary key fields and information identifying one or more normalized datasets associated with each secondary key field, is received. A denormalized table comprising fields and data types corresponding to said denormalized dataset, said denormalized table having a primary key field corresponding to said primary key field associated with said denormalized dataset, is created. The said information identifying the one or more normalized datasets associated with each secondary key field, creating one or more normalized tables, each of said one or more normalized tables corresponding to a respective one of said one or more normalized datasets, each of said one or more normalized tables comprising a foreign key corresponding to said associated primary key and a primary key corresponding to the secondary key field associated with said normalized dataset, is utilized. Each of said foreign keys in said one or more normalized tables to delimit fields in each of said one or more normalized tables and using said fields indicated as secondary keys in said denormalized table as primary keys in said one or more normalized tables, is utilized.

BRIEF DESCRIPTION OF THE DRAWINGS

FIGS. 5A and 5B are portions of a data table of denormalized data comprising the sample data of FIGS. 2-4, in accordance with an embodiment of the present invention;

DETAILED DESCRIPTION

Embodiments of the invention handle a denormalized dataset with multiple dimensions in an RDBMS environment by creating a denormalized data table. The denormalized data table generates a set of normalized data tables that allow for the denormalized dataset to be transformed as a normalized data table. A normalized data table stores data, as well as relating the data from the generated set of normalized data tables.

Denormalization of data is a process of attempting to optimize the read performance of a database by adding redundant data or by grouping data. In some cases, denormalization is can be performed to address performance or scalability in RDBMS systems. A dataset with a normalized design will often store different, but related, pieces of information in separate logical tables, called relations. If these relations are stored physically as separate disk files, executing a database query that draws information from several relations, such as a join operation can be slow. If many relations are joined, executing the database query may be prohibitively slow.

A new set of data tables can be created with a star data structure from an original denormalized data structure. In a star data structure, one or more fact data tables can reference any number of dimension data tables. A fact data table may include, for example, data relating to an employee's competency or education. A dimension data table may contain, for example, data relating to an employee's particular level of competence for each competency or a name, type and location of an institute associated with each employee's education.

The star data structure can be defined by adding keywords to a CREATE statement in a RDBMS environment. The denormalized dataset is loaded based on the newly created star data structure following a field correspondence created by the definition in the CREATE statement. Subsequently, a database query can be executed on the newly created star data structure which can be transformed by an RDBMS engine to generate required insight results.

Figure 1:
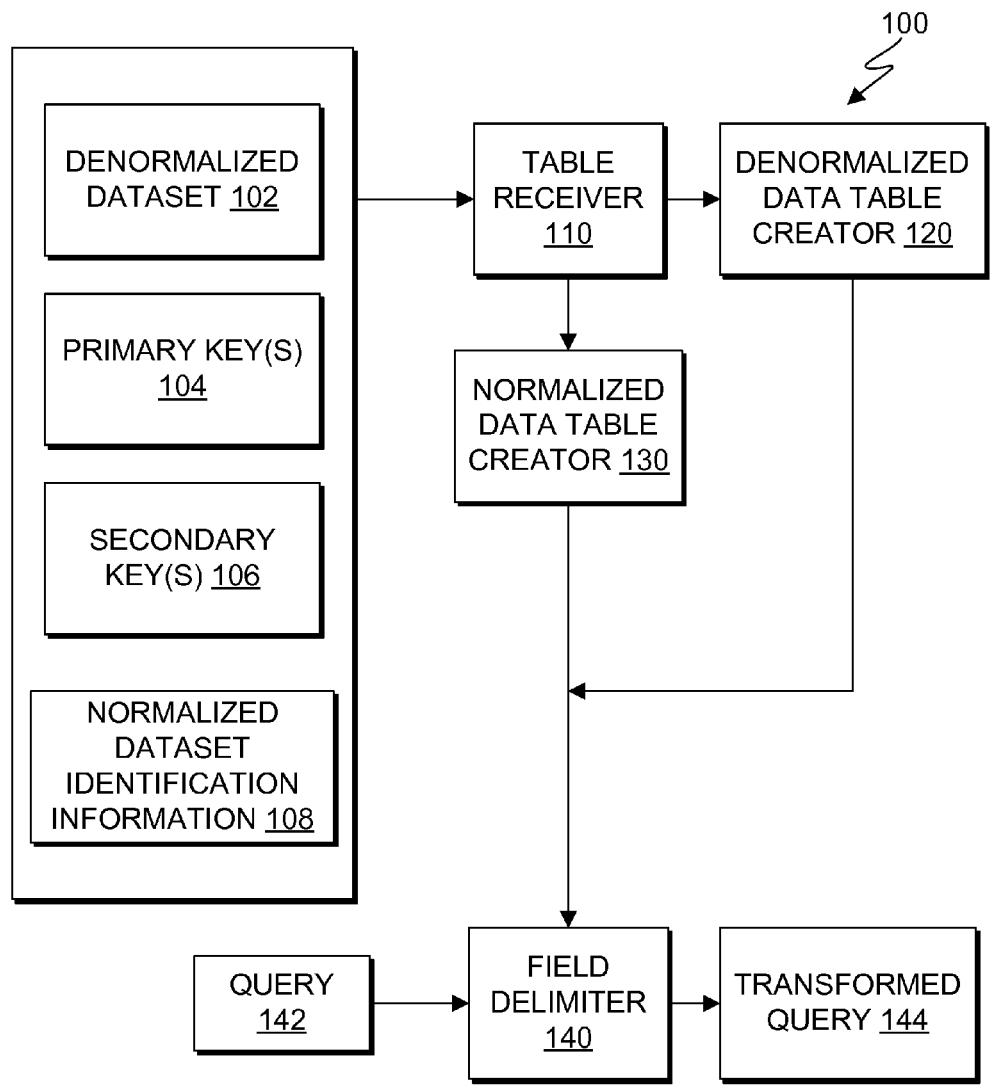
FIG. 1 is a block diagram of a computer system, in accordance with an embodiment of the present invention.

FIG. 1 is a block diagram of computer system 100, in accordance with an embodiment of the present invention. Computer system 100 can be a desktop computers, laptop computer, specialized computer server, or any other computer system known in the art, in accordance with an embodiment of the present invention. In certain embodiments, computer system 100 represents one or more computer systems utilizing clustered computers and components to act as a single pool of seamless resources when accessed through a network. In general, computer system 100 is representative of any electronic devices or combination of electronic devices, capable of executing machine-readable program instructions in accordance with an embodiment of the present invention, as described in greater detail with regard to FIG. 8. In other embodiments, computer system 100 may be implemented in a cloud computing environment, as described in greater detail with regard to FIGS. 9 and 10.

Table receiver 110 receives a denormalized dataset 102, which may correspond to that of FIGS. 5A and 5B. Table receiver 110 also receives an associated primary key 104 and one or more associated secondary keys 106. Table receiver 110 further receives normalized dataset identification information 108 identifying one or more normalized datasets associated with each secondary key 106 field. Denormalized data table creator 120 creates a denormalized data table, which may comprise that of FIGS. 5A and 5B, and which is created using the CREATE statement as described in greater detail with regard to FIGS. 5A and 5B. Normalized data table creator 130 can create normalized dataset identification information 108, which is used to create one or more normalized data tables, where each of the one or more normalized data tables correspond to a respective one of the one or more normalized datasets.

Field delimiter 140 utilizes each of the fields, as described in greater detail with regard FIGS. 5A and 5B, as secondary keys 106 to delimit fields in each of normalized secondary data tables, and as primary keys 106 in order to transform query 142 into transformed query 144.

Figure 2:
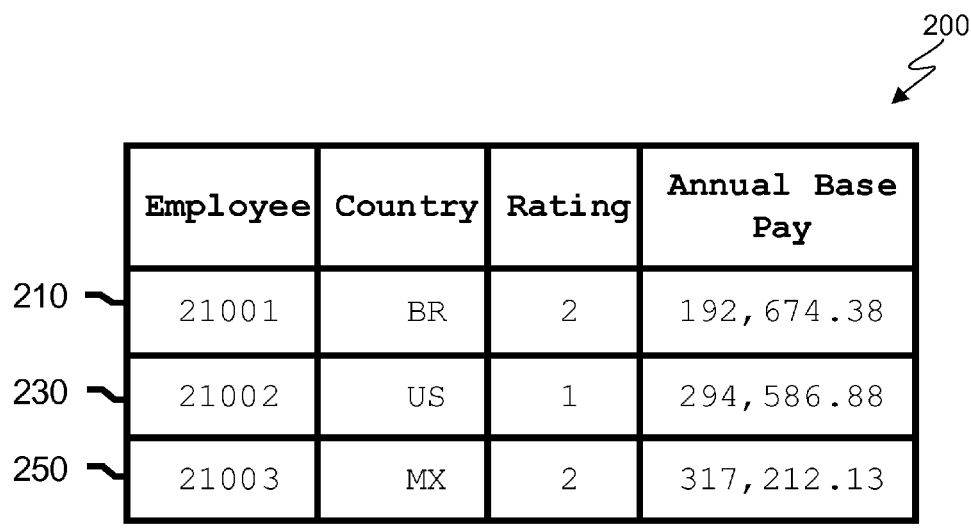
FIG. 2 is a data table of a first sample of normalized data associated with three employees, in accordance with an embodiment of the present invention.

FIG. 2 is data table 200 of a first sample of normalized data associated with three employees, in accordance with an embodiment of the present invention. Table 200 may be denormalized as a process to generate a denormalized data table, as described in greater detail with regard to FIGS. 5A and 5B. The three employees are identified by an "Employee" field, in this example, having employee identifiers of 21001, 21002 and 21003. Further exemplary fields, "Country", Rating" and "Annual Base Pay" are shown, containing information that further describes the employees. Data associated with the employee having an identifier 21001 is found in record 210, data associated with the employee having an identifier 21002 is found in record 230 and data associated with the employee having an identifier 21003 is found in record 250.

Figure 3:
FIG. 3 is a data table of a second sample of normalized data relating to competency and which is associated with the same three employees as FIG. 2, in accordance with an embodiment of the present invention.

Data table 200 may be created using the following SQL statements:
CREATE TABLE employee(
    Employee PRIMARY KEY,
    Country,
    Rating,
    Annual Base Pay);

FIG. 3 is data table 300 of a second sample of normalized data relating to competency and which is associated with the same three employees as FIG. 2, in accordance with an embodiment of the present invention. Data table 300 may be denormalized as a process to generate a denormalized data table, as described in greater detail with regard to FIGS. 5A and 5B. The three employees are identified by an "Employee" field, in this example, having employee identifiers of 21001, 21002 and 21003. Further exemplary fields, "Competency" and "Competency Level" are shown, containing information that further describes the employees' competencies. Data associated with the employee having an identifier 21001 is found in records 312, 314, 316 and 318, data associated with the employee having an identifier 21002 is found in records 332, 334 and 336 and data associated with the employee having an identifier 21003 is found in records 352 and 354.

Figure 4:
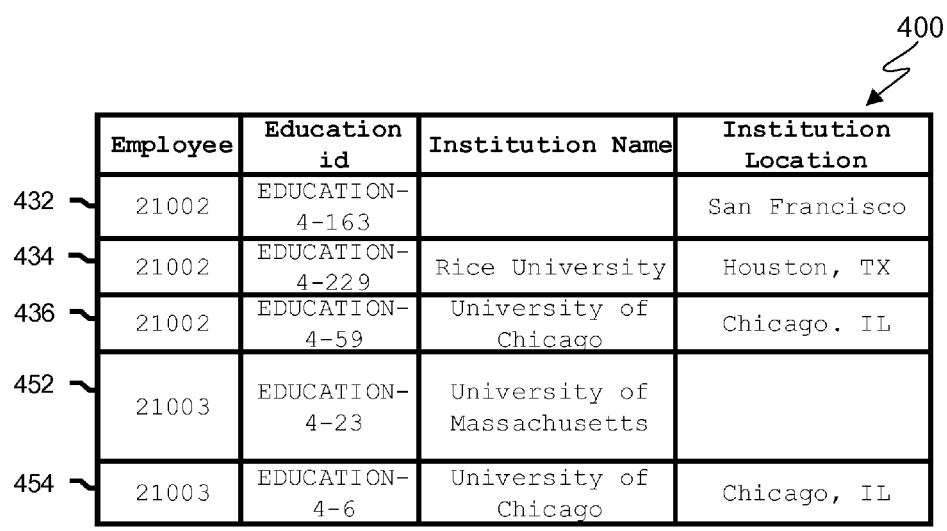
FIG. 4 is a data table of a third sample of normalized data relating to education and which is associated with the same three employees as FIG. 2, in accordance with an embodiment of the present invention.

Data table 300 may be created using the following SQL statements:
CREATE TABLE competency(
    Employee PRIMARY KEY,
    Competency PRIMARY KEY,
    Competency Level,
    FOREIGN KEY (Employee) REFERENCES TO employee(Employee));

FIG. 4 is data table 400 of a third sample of normalized data relating to education and which is associated with the same three employees as FIG. 2, in accordance with an embodiment of the present invention. Data table 400 may be denormalized as a process to generate a denormalized data table, as described in greater detail with regard to FIGS. 5A and 5B. The three employees are identified by an "Employee" field, in this example, having employee identifiers of 21001, 21002 and 21003. Further exemplary fields, "Education id, "Institution Name" and "Institution Location" are shown, containing information further describing the employees' education. There is no data in data table 400 for the employee having an identifier 21001, data associated with the employee having an identifier 21002 is found in records 432, 434 and 436 and data associated with the employee having an identifier 21003 is found in records 452 and 454.

Data table 400 may be created using the following SQL statements:
CREATE TABLE education(
    Employee PRIMARY KEY,
    Education id PRIMARY KEY,
    Institution Name,
    Institution Location,
    FOREIGN KEY (Employee) REFERENCES TO employee(Employee));

FIGS. 5A and 5B are portions of data table 500 that includes denormalized data comprising the sample data of FIGS. 2-4, in accordance with an embodiment of the present invention. In this embodiment, one portion of data table 500 is presented on FIG. 5A and another portion of data table 500 is presented on FIG. 5B. A number of records in data table 500 show duplicated information. In a fully denormalized dataset there are a number of fields that will have duplicated values to contemplate all possible combinations of data. All of the field names used and the data contained in the records of the tables are exemplary only as is the number and type of the fields.

The first four records of data table 500 are associated with the employee having an employee identifier of 21001. The Country, Rating and Annual Base Pay fields from data table 200 of FIG. 2 of each of the first four records are duplicated information. This information is duplicated in each of the four records because data table 300 of FIG. 3 contained four records 312-318 relating to competencies and all being associated with the employee having an employee identifier of 21001. The Competency and Competency Level fields in data table 500 contain this data from data table 300 of FIG. 3. As data table 400 of FIG. 4 contained no records relating to the employee having an employee identifier of 21001, these fields in each of the first four records are blank.

The next nine records of data table 500 are associated with the employee having an employee identifier of 21002. The Country, Rating and Annual Base Pay fields from data table 200 of FIG. 2 of each of the next nine records are duplicated information. This information is duplicated in each of the nine records because data table 300 of FIG. 3 contains three records 332-336 relating to competencies, all associated with the employee having an employee identifier of 21002 and data table 400 of FIG. 4 contains three records 432-436 relating to education, all associated with the employee having an employee identifier of 21002. The Competency and Competency Level fields of data table 500 contain this data from data table 300 of FIG. 3 and the Education ID, Institution Name and Institution Location contain this data from data table 400 of FIG. 4. The three competency records 332-336 from FIG. 3 in combination with the three education records 432-436 from FIG. 4 provide nine combinations for the employee having an employee identifier of 21002 shown in FIGS. 5A and 5B.

The last four records of data table 500 are associated with the employee having an employee identifier of 21003. The Country, Rating and Annual Base Pay fields from data table 200 of FIG. 2 of each of the last four records are duplicated information. This information is duplicated in each of the four records because data table 300 of FIG. 3 contains two records 352, 354 relating to competencies, both associated with the employee having an employee identifier of 21003 and data table 400 of FIG. 4 contains two records 452, 454 relating to education, both associated with the employee having an employee identifier of 21003. The Competency and Competency Level fields in data table 500 contain this data from data table 300 of FIG. 3 and the Education ID, Institution Name and Institution Location contain this data from data table 400 of FIG. 4. The two competency records from FIG. 3 in combination with the two education records from FIG. 4 provide four combinations for the employee having an employee identifier of 21003 shown in FIGS. 5A and 5B.

The number of records associated with each employee may vary depending on the number of entries in the competency and education tables for each employee. In an example, an employee may have no entries in either of the Competency or Education tables and so there will be no duplicated records. In another example, there may be more tables other than the Competency and Education tables referred to.

The data in data table 500 can be used in analytics as the multiplicity of information will have an impact on any calculations performed on fields of the data. As an example a question like "Show me the average of Annual Base Pay by Competency" will return incorrect results (275,921.53) as duplicated competences are counted three times for employee 21002 and two times for employee 21003 and duplicated education details are counted three times for employee 21002 and two times for employee 21003. The correct result should be 268,151.80, counting the results for each of the employees just once.

Embodiments of the method of the present invention work by transparently rewriting or redefining the SQL syntax to create a table that holds the denormalized dataset and the queries that will be executed against data table 500.

To determine how a new dataset of data table 500 can be created, the CREATE sentence uses new keywords DENORMALIZED and SECONDARY KEY. The purpose of these key words is to instruct the SQL parser that the table must be created as a composition of underlying tables and to use the fields indicated by the SECONDARY key word to delimit the fields on each of the tables and to use them as primary keys. Other keywords may be used in place of DENORMALIZED and SECONDARY KEY, such as DENORM and SECOND KEY, so long as these keywords perform the function described above.

Data table 500 can be created using the following SQL statements:
CREATE DENORMALIZED TABLE denormalized_employee(
Employee PRIMARY KEY,
Country,
Rating,
Annual Base Pay,
Competency SECONDARY KEY,
Competency Level,
Education id SECONDARY KEY,
Institution Name,
Institution Location);

The new keywords DENORMALIZED and SECONDARY KEY in the statements above are shown in bold, underline, only to highlight them in this text and in an exemplary embodiment they would not be bold or underline.

Once data table 500 has been created the original dataset will be exposed as a regular table to the user. The underlying tables do not need to be exposed as direct access by the user should not be allowed.

Data table 500 will accept any standard SQL query and will return the correct results after the query has been transparently transformed accordingly. The SQL query needs to be transformed as needed by the SQL parser to get the right data as a result of the join of the underlying tables as required.

Figure 6:
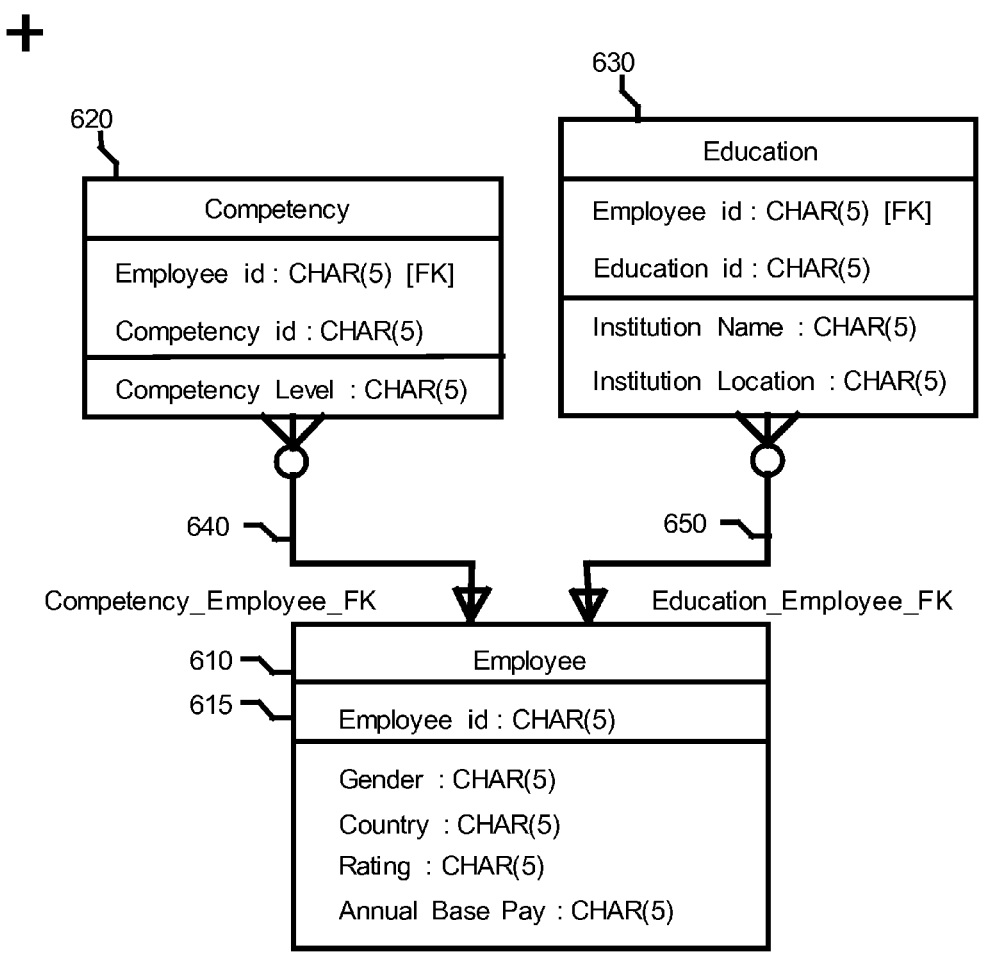
FIG. 6 is a logical data model of the tables of FIGS. 5A and 5B, in accordance with an embodiment of the present invention.

FIG. 6 is a logical data model of data table 500 presented in FIGS. 5A and 5B, in accordance with an embodiment of the present invention. The contents of data table 500 which were derived from data table 200 appears in the Employee table 610. Employee table 610 comprises a primary key 615. The contents of data table 500 which were derived from data table 300 appears in Competency table 620. The contents of data table 500 which were derived from data table 400 appears in Education table 630. Competency table 620 in the logical data model is linked to Employee table 610 by means of foreign key 640 which was defined in the table definition using the keyword "SECONDARY KEY." Education table 630 in the logical data model is linked to Employee table 610 by means of foreign key 650 which was defined in the table definition using the keyword "SECONDARY KEY". In embodiments of the present invention, when Employee table 610 is created, the statements used to create Employee table 610 include the fields that are found in Competency table 620 and Education table 630 of the logical data model. In typical processes, Competency table 620 and the Education table 630 of the logical data model are created as separate data tables. Embodiments of the present invention create a denormalized table including the fields of the separate Competency table 620 and Education table 630 in the denormalized table.

Samples of these transformations are showed below. For each of the sample queries, the query in natural language is first given, followed by the query as implemented according to embodiments of the present invention and then by the query as implemented according to the prior art.

Figure 7:
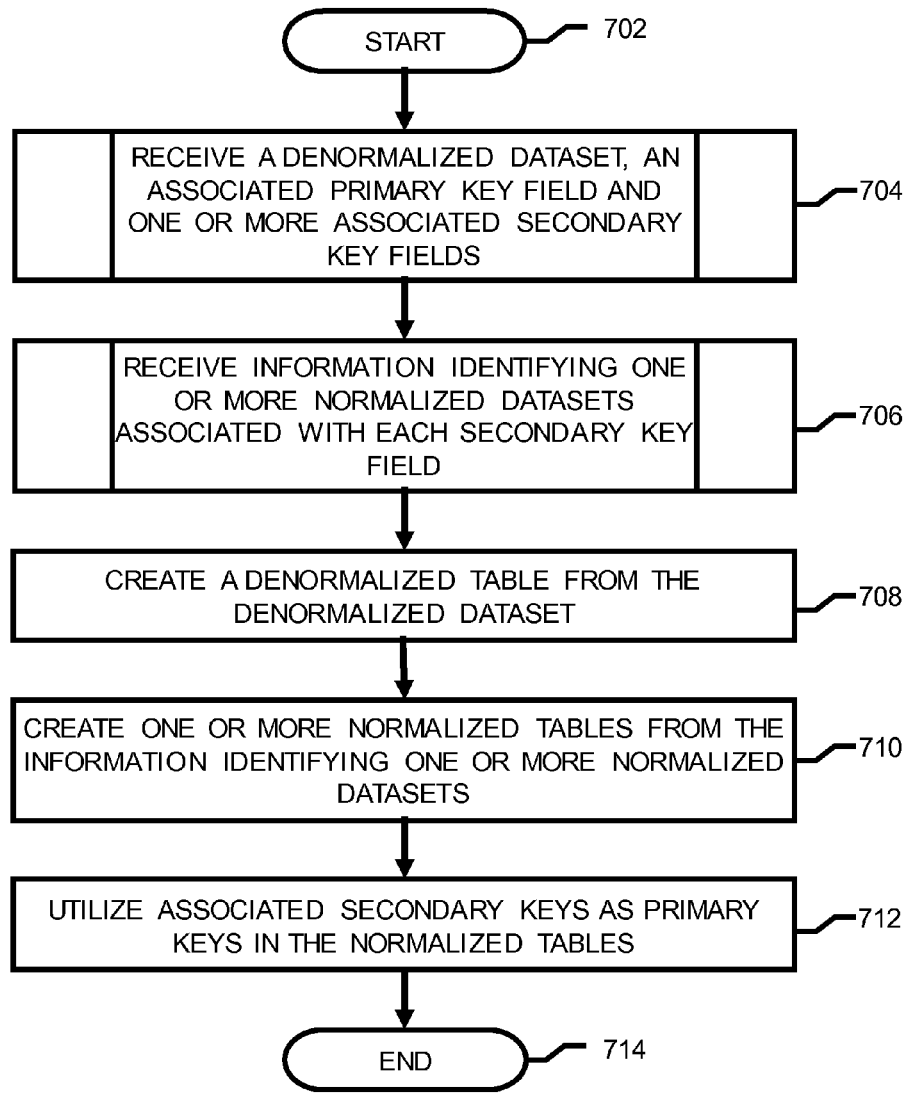
FIG. 7 is a flowchart illustrating operational steps, in accordance with an embodiment of the present invention.

Q1.—Show me the number of employees:
select count(*) from denormalized_employees;
select count(*) from employee;
Q2.—Show me the number of employees by competency:
select count(*), competency from denormalized_employees group by competency;
select count(*), competency from employee group by competency;

Q3.—Show me the number of employees by country
  select count(*), country from denormalized_employees group by country;
  select count(*), country from competences group by country;
Q4.—Show me the sum and average of total annual base pay by competency:
  select sum(total_annual_base_pay), avg(total_annual_base_pay), competency from denormalized_employees group by competency;
  select sum(total_annual_base_pay), avg(total_annual_base_pay), competency from employees join competences on employee.employee_id=competences.employee_id group by competency;
Q5.—Show me the sum and average of total annual base pay by competency and institution name:
  select sum(total_annual_base_pay), avg(total_annual_base_pay), competency, institution_name from denormalized_employees group by competency, institution_name;
  select sum(total_annual_base_pay), avg(total_annual_base_pay), competency, institution_name from employee left join competences on employee.employee_id=competences.employee_id left join education on employee.employee_id=education.employee_id group by competency, institution_name;

FIG. 7 is a flowchart illustrating operational steps, in accordance with an embodiment of the present invention. The method starts at step 702. At step 704, a denormalized dataset is received, together with an associated primary key field and one or more associated secondary key fields. In the example described above, the denormalized dataset corresponds to the dataset of FIGS. 5A and 5B, the associated primary key corresponds to Employee id field 615 of Employee table 610 and the one or more associated secondary keys correspond to the Competency id field of Competency table 620 and the Education id field of Education table 630. As mentioned above, Employee table 610 corresponds to the data table 200 of FIG. 2 and the Competency table 620 corresponds to the data table 300 of FIG. 3.

At step 706, information identifying one or more normalized datasets associated with each secondary key field is received. In the example described above, the one or more normalized datasets are the datasets of FIGS. 2-4, that is the normalized datasets of the data tables 200, 300, and 400. Each of the one or more normalized datasets are related to each other. The information identifying the normalized datasets includes the fields which make up each of the normalized datasets, that is, the Employee id, Country, Nationality, Rating and Annual Base Pay fields for the Employee normalized dataset, the Employee id, Competency id and Competency level fields for the Competency normalized dataset and the Employee id, Education id, Institution Name and Institution Location for the Education normalized dataset. In an embodiment, the information identifying one or more normalized datasets associated with each secondary key field may be received at the same time as the denormalized dataset or it may be received before the denormalized dataset is received.

At step 708, a denormalized table is created from the denormalized dataset. The CREATE statement to achieve this was described above with reference to FIGS. 5A and 5B. As mentioned above, denormalized table comprises the denormalized data originating from each of the normalized data from data table 200 of FIG. 2, the normalized data from data table 300 of FIG. 3, and the normalized data from data table 400 of FIG. 4.

At step 710, the information identifying the one or more normalized datasets associated with each secondary key field, is used to create one or more normalized tables, each of the one or more normalized tables corresponding to a respective one of the one or more normalized datasets. Each of the one or more normalized tables comprises a foreign key corresponding to the associated primary key and a primary key corresponding to the secondary key field associated with the normalized dataset. Each of the fields indicated as foreign keys 640, 650 in the second tables 620, 630 are indicated as secondary keys in the normalized tables. In the one of the secondary tables 620, the foreign key 640 is the Competency_Employee field and in the one of the secondary tables 630, the foreign key 650 is the Education_Employee field. In other embodiments, there may be any number of tables 620, 630, each table have a corresponding foreign key 640 and 650. The denormalized table created at step 710 does not hold the data, which is held in the normalized tables created at step 712. This data is pointed to by the primary and secondary key fields of the denormalized table. In preferred embodiments, the set of normalized data tables are not exposed to an end user. Typically, a database administrator has access to the set of normalized data tables for maintenance purposes as is normal with any other database object. End users have access to the data by means of the denormalized table and the database engine which transforms the query issued against the denormalized table to be properly executed on the normalized data tables.

At step 712, each of the foreign keys in the one or more normalized tables are utilized to delimit fields in each of the one or more normalized tables. The fields indicated as secondary keys in the denormalized table are used as primary keys in the one or more normalized tables. The method as described by the flowchart ends at step 714.

Figure 8:
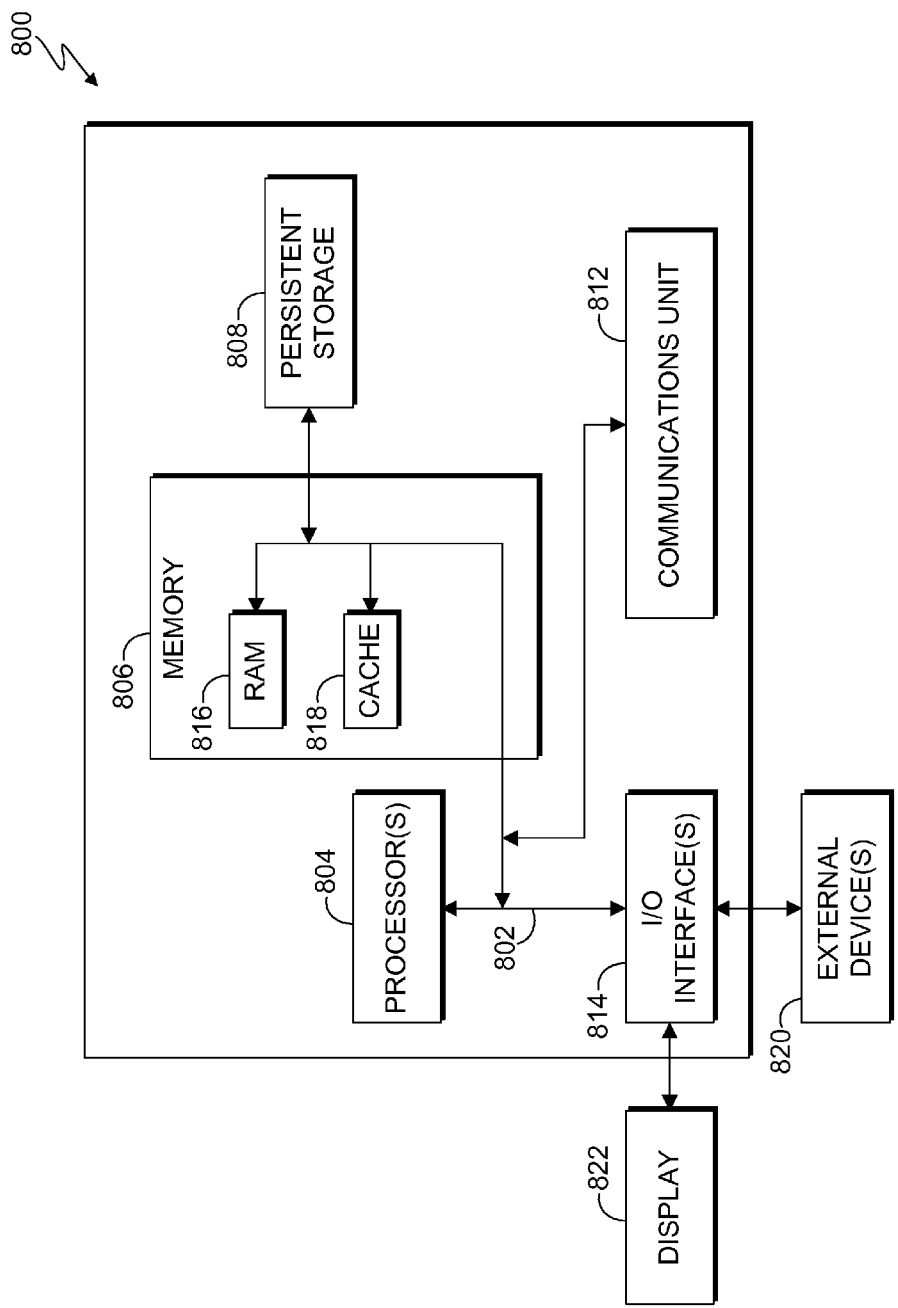
FIG. 8 is a block diagram illustrating an environment in which the computer system of FIG. 1 can be implemented, in accordance with an embodiment of the present invention.

FIG. 8 is a block diagram of internal and external components of a computer system 800, which is representative the computer systems of FIG. 1, in accordance with an embodiment of the present invention. It should be appreciated that FIG. 8 provides only an illustration of one implementation and does not imply any limitations with regard to the environments in which different embodiments may be implemented. In general, the components illustrated in FIG. 8 are representative of any electronic device capable of executing machine-readable program instructions. Examples of computer systems, environments, and/or configurations that may be represented by the components illustrated in FIG. 8 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 800 includes communications fabric 802, which provides for communications between one or more processors 804, memory 806, persistent storage 808, communications unit 812, and one or more input/output (I/O) interfaces 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 408 are computer-readable storage media. In this embodiment, memory 806 includes random access memory (RAM) 816 and cache memory 818. In general, memory 806 can include any suitable volatile or non-volatile computer-readable storage media. Software is stored in persistent storage 808 for execution and/or access by one or more of the respective processors 804 via one or more memories of memory 806.

Persistent storage 808 may include, for example, a plurality of magnetic hard disk drives. Alternatively, or in addition to magnetic hard disk drives, persistent storage 808 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 808 can also be removable. For example, a removable hard drive can be used for persistent storage 808. Other examples include optical and magnetic disks, thumb drives, and smart cards that are inserted into a drive for transfer onto another computer-readable storage medium that is also part of persistent storage 808.

Communications unit 812 provides for communications with other computer systems or devices via a network. In this exemplary embodiment, communications unit 812 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 812 (e.g., via the Internet, a local area network or other wide area network). From communications unit 812, the software and data can be loaded onto persistent storage 408.

One or more I/O interfaces 814 allow for input and output of data with other devices that may be connected to computer system 800. For example, I/O interface 814 can provide a connection to one or more external devices 820, such as a keyboard, computer mouse, touch screen, virtual keyboard, touch pad, pointing device, or other human interface devices. External devices 820 can also include portable computer-readable storage media such as, for example, thumb drives, portable optical or magnetic disks, and memory cards. I/O interface 814 also connects to display 822.

Display 822 provides a mechanism to display data to a user and can be, for example, a computer monitor. Display 822 can also be an incorporated display and may function as a touch screen, such as a built-in display of a tablet computer.

Figure 9:
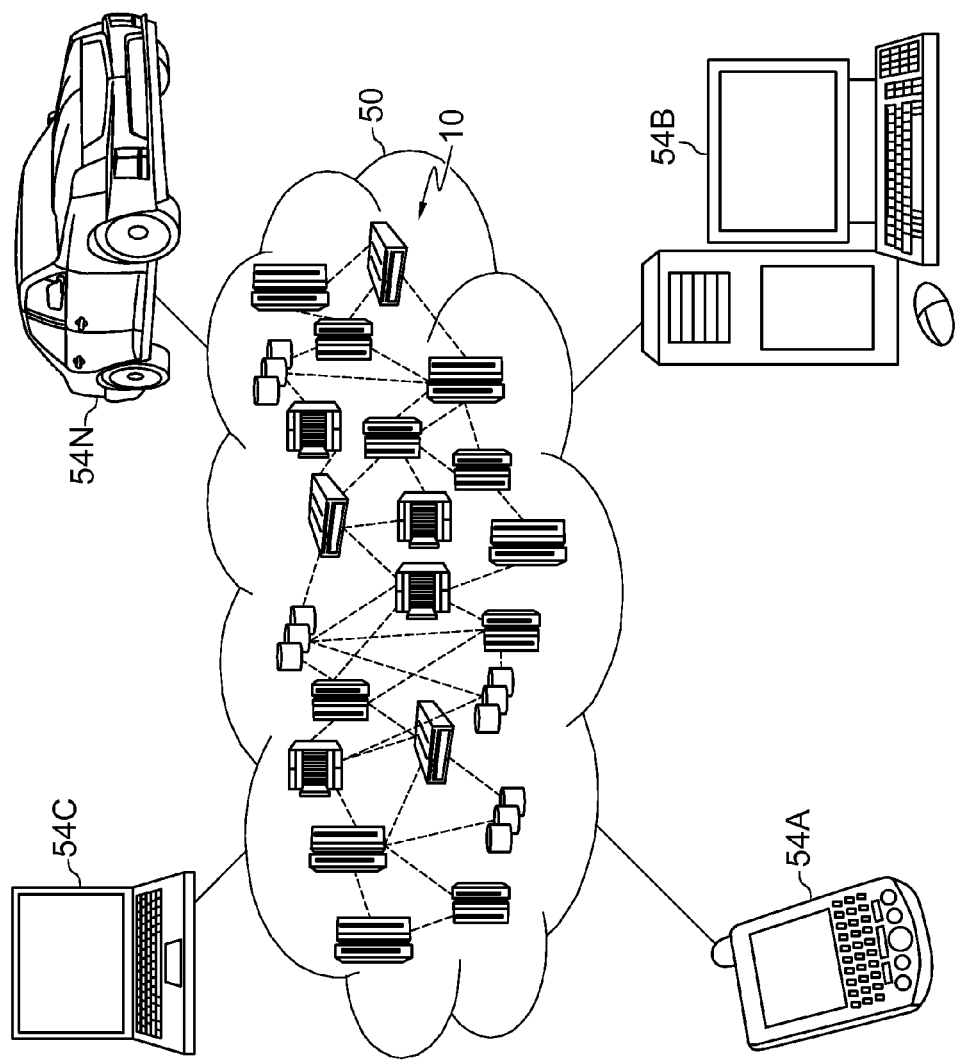
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that cloud computing nodes 10 and cloud computing environment 50 can communicate with any type of computerized device over any type of network and/or network addressable connection (e.g., using a web browser).

Figure 10:
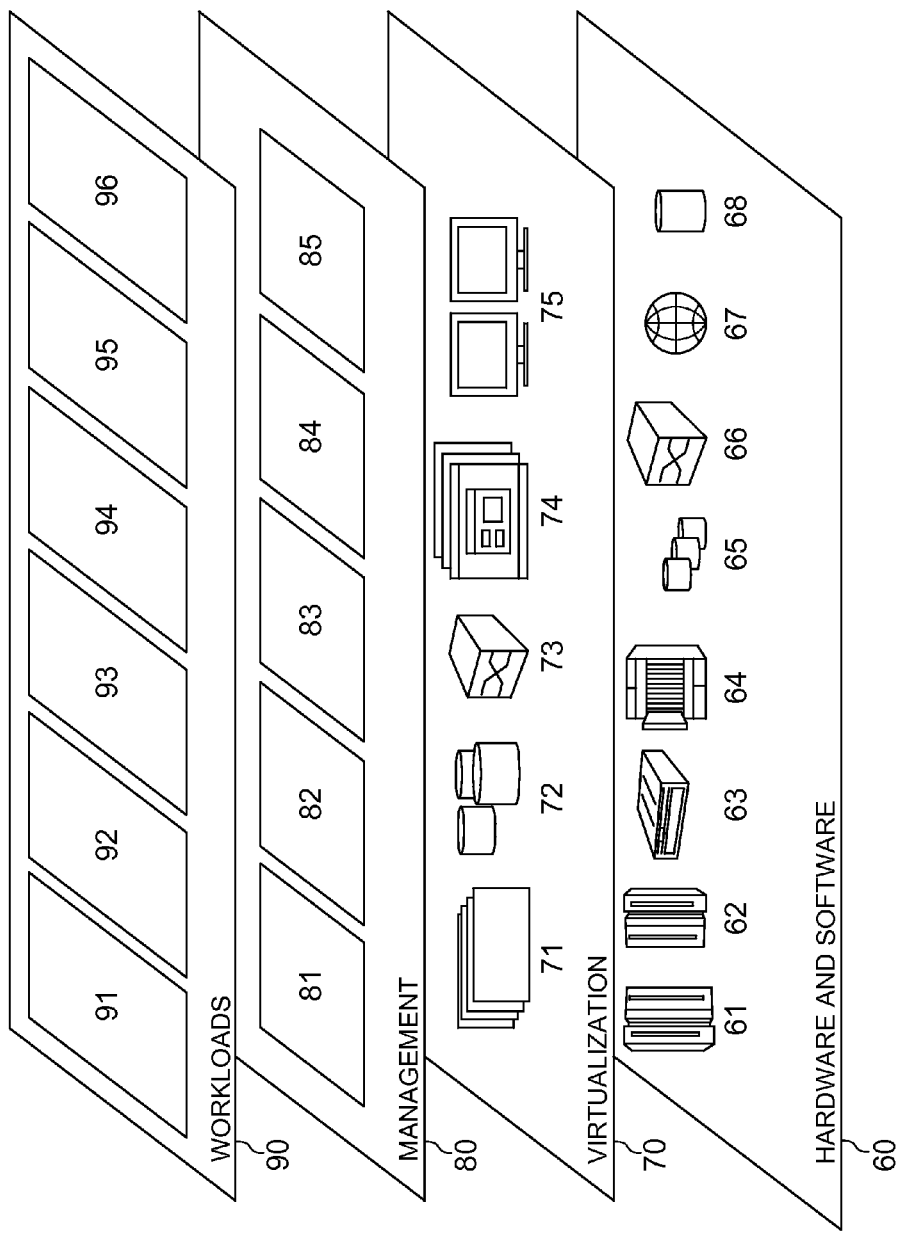
FIG. 10 depicts abstraction model layers, in accordance with an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer system environment 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

receiving, by one or more computer processors from a computer readable storage medium, a denormalized dataset including a denormalized dataset primary key and one or more denormalized dataset secondary keys;

identifying, by the one or more computer processors, one or more normalized datasets associated with each of the one or more denormalized dataset secondary keys;

creating, by the one or more computer processors, a denormalized table, wherein a denormalized table primary key corresponds to the denormalized dataset primary key;

receiving, by the one or more computer processors, a query for execution on data included in the denormalized table;

for each of the one or more normalized datasets:

identifying, by the one or more computer processors, a denormalized table secondary key in the denormalized table;

creating, by the one or more computer processors, at least one normalized table, wherein a foreign key of the at least one normalized table corresponds to the primary key of a respective normalized dataset, and a primary key of the at least one normalized table corresponds to the denormalized table secondary key, whereby the at least one normalized table includes less redundant data than the denormalized table;

delimiting, by the one or more computer processors, fields in the at least one normalized table using the foreign key of the at least one normalized table, wherein delimiting comprises using the secondary key in the denormalized table as the primary key in the normalized table;

transforming, by the one or more computer processors, the received query for execution on data included in the at least one normalized table created for each of the one or more normalized datasets based on the delimited fields and removing duplicate entries from the fields in the at least one normalized table;

executing, by the one or more computer processors, the transformed query; and returning, by the one or more computer processors, a result for the transformed query.

2. A computer program product, the computer program product comprising:
one or more computer readable storage media and program instructions stored on the one or more computer readable storage media, the program instructions comprising:
program instructions to receive a denormalized dataset, including a denormalized dataset primary key and one or more denormalized dataset secondary keys;
program instructions to identify one or more normalized datasets associated with each of the one or more denormalized dataset secondary keys;
program instructions to create a denormalized table, wherein a denormalized table primary key corresponds to the denormalized dataset primary key;
program instructions to receive a query for execution on data included in the denormalized table;
for each of the one or more normalized datasets:
program instructions to identify a denormalized table secondary key in the denormalized table;
program instructions to create at least one normalized table, wherein a foreign key of the at least one normalized table corresponds to the primary key of a respective normalized dataset, and a primary key of the at least one normalized table corresponds to the denormalized table secondary key, whereby the at least one normalized table includes less redundant data than the denormalized table;
program instructions to delimit fields in the at least one normalized tables and using the foreign key of the at least one normalized table, wherein the program instructions to delimit comprise using the secondary key in the denormalized table as the primary key in the normalized table;
program instructions to transform the received query for execution on data included in the at least one normalized table created for each of the one or more normalized datasets based on the delimited fields and removing duplicate entries from the fields in the at least one normalized table;
program instructions to execute the transformed query; and
program instructions to return a result for the transformed query.

3. A computer system, the computer system comprising:
one or more computer processors;
one or more non-transitory computer readable storage media;
program instructions stored on the one or more computer readable storage media for execution by at least one of the one or more processors, the program instructions comprising:
program instructions to receive a denormalized dataset, including a denormalized dataset primary key and one or more denormalized dataset secondary keys;
program instructions to identify one or more normalized datasets associated with each of the one or more denormalized dataset secondary keys;
program instructions to create a denormalized table, wherein a denormalized table primary key corresponds to the denormalized dataset primary key;
program instructions to receive a query for execution on data included in the denormalized table;
for each of the one or more normalized datasets:
program instructions to identify a denormalized table secondary key in the denormalized table;
program instructions to create at least one normalized table, wherein a foreign key of the at least one normalized table corresponds to the primary key of a respective normalized dataset, and a primary key of the at least one normalized table corresponds to the denormalized table secondary key, whereby the at least one normalized table includes less redundant data than the denormalized table;
program instructions to delimit fields in the at least one normalized table using the foreign key of the at least one normalized table, wherein the program instructions to delimit comprise using the secondary key in the denormalized table as the primary key in the normalized table;
program instructions to transform the received query for execution on data included in the at least one normalized table created for each of the one or more normalized datasets based on the delimited fields and removing duplicate entries from the fields in the at least one normalized table;
program instructions to execute the transformed query; and
program instructions to return a result for the transformed query.

* * * * *